US007709974B2

(12) United States Patent

Hong et al.

(10) Patent No.: US 7,709,974 B2
(45) Date of Patent: May 4, 2010

(54) POWER SUPPLY DEVICE

(75) Inventors: Young Gun Hong, Suwon-si (KR); Hyo Young Kim, Suwon-si (KR); Ku Yong Kim, Suwon-si (KR); Dong Seong Oh, Incheon (KR); Jae Sun Won, Suwon-si (KR)

(73) Assignee: Samsung Electro-Mechanics Co., Ltd., Suwon-Si, Gyunggi-Do (KR)

( * ) Notice: Subject to any disclaimer, the term of this patent is extended or adjusted under 35 U.S.C. 154(b) by 53 days.

(21) Appl. No.: 12/102,551

(22) Filed: Apr. 14, 2008

(65) Prior Publication Data

US 2009/0152946 A1 Jun. 18, 2009

(30) Foreign Application Priority Data

Dec. 18, 2007 (KR) ..................... 10-2007-0133404

(51) Int. Cl.
*H02J 3/00* (2006.01)
*H05B 37/00* (2006.01)
*H05B 41/16* (2006.01)

(52) U.S. Cl. .......................... 307/17; 315/177; 315/277

(58) Field of Classification Search ................... 307/11, 307/17; 315/177, 277, 282
See application file for complete search history.

(56) References Cited

U.S. PATENT DOCUMENTS

2008/0211615 A1* 9/2008 Ushijima et al. ............ 336/170

FOREIGN PATENT DOCUMENTS

| | | | |
|---|---|---|---|
| KR | 1020040018658 | A | 3/2004 |
| KR | 1020060097586 | A | 9/2006 |
| KR | 1020060116526 | A | 11/2006 |
| KR | 10-2007-0052394 | A | 7/2007 |
| KR | 10-0738013 | B1 | 7/2007 |
| KR | 100826413 | B1 | 4/2008 |

* cited by examiner

*Primary Examiner*—Jared J Fureman
*Assistant Examiner*—Michael Rutland Wallis
(74) *Attorney, Agent, or Firm*—Lowe Hauptman Ham & Berner

(57) ABSTRACT

Provided is a power supply device including a power supply unit that supplies a driving voltage for driving at least one or more loads; a current balancing unit that maintains a current balance of the driving voltage supplied to the respective loads; a detection unit that detects currents flowing in the current balancing unit through electromagnetic induction so as to output a detection signal; and a control unit that receives the detection signal to judge whether the loads are opened or not and outputs a control signal for controlling the magnitude of the driving voltage.

12 Claims, 5 Drawing Sheets

[FIG. 1]
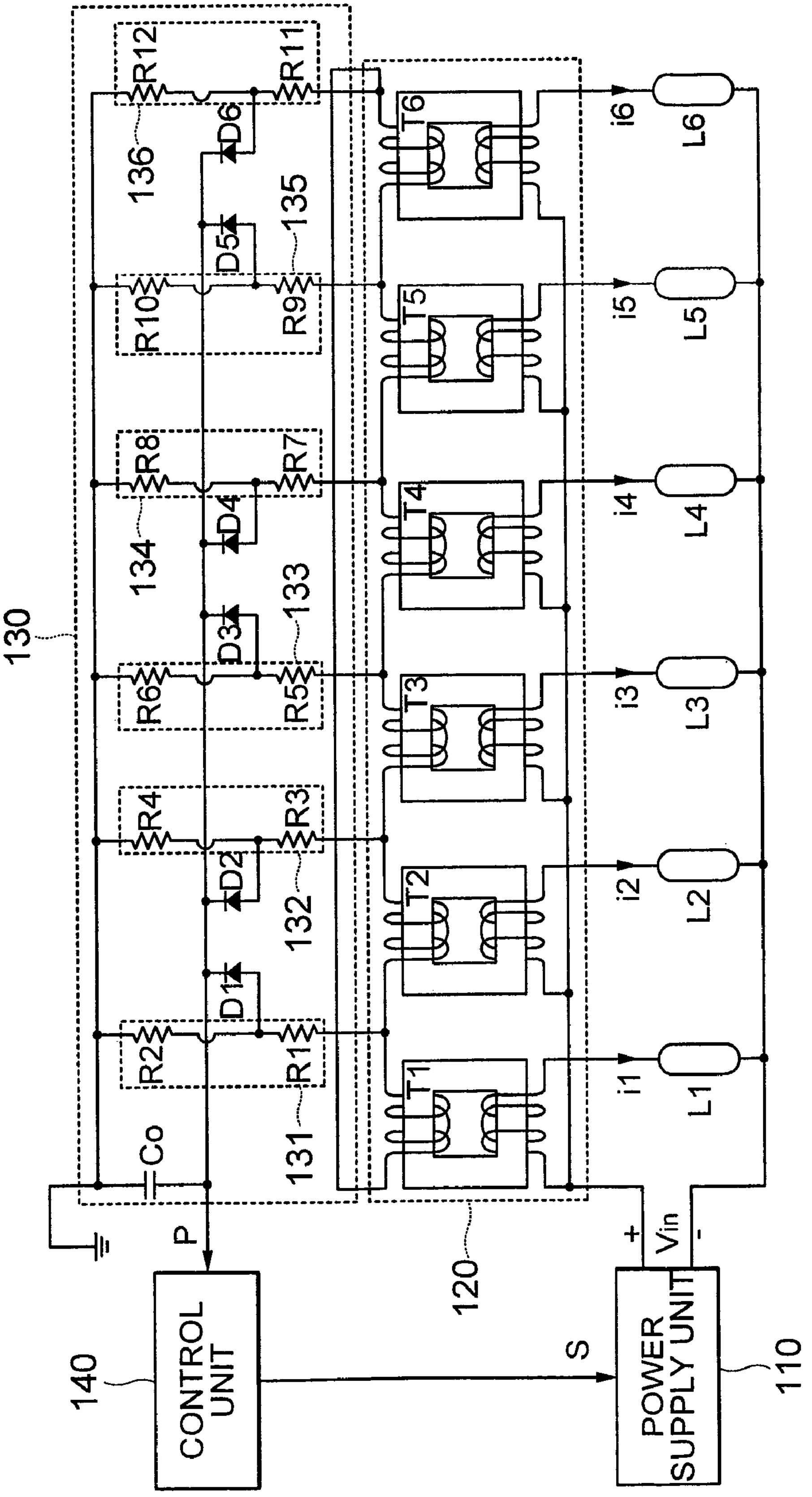
PRIOR ART

[FIG. 2]
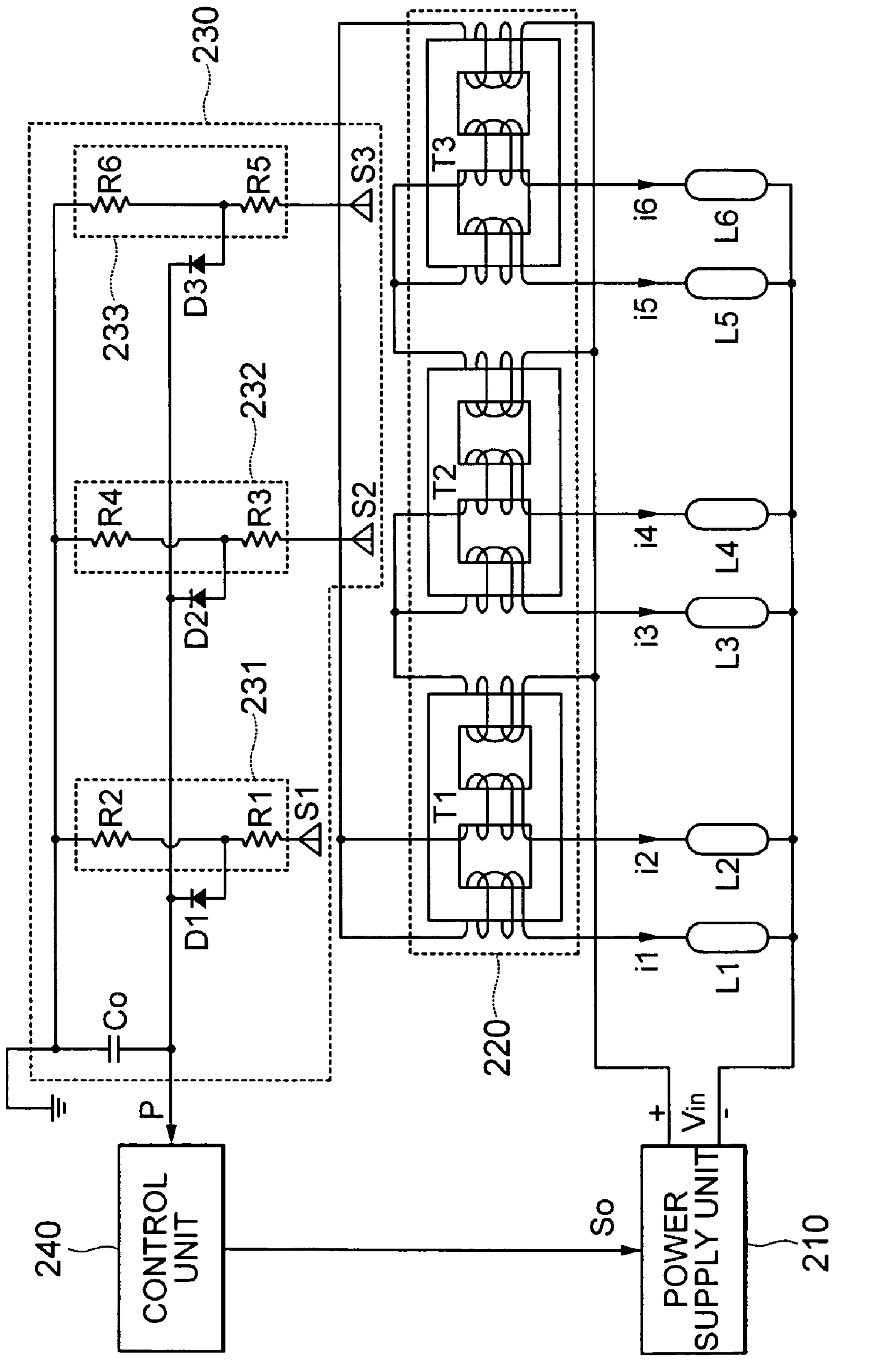

[FIG. 3]
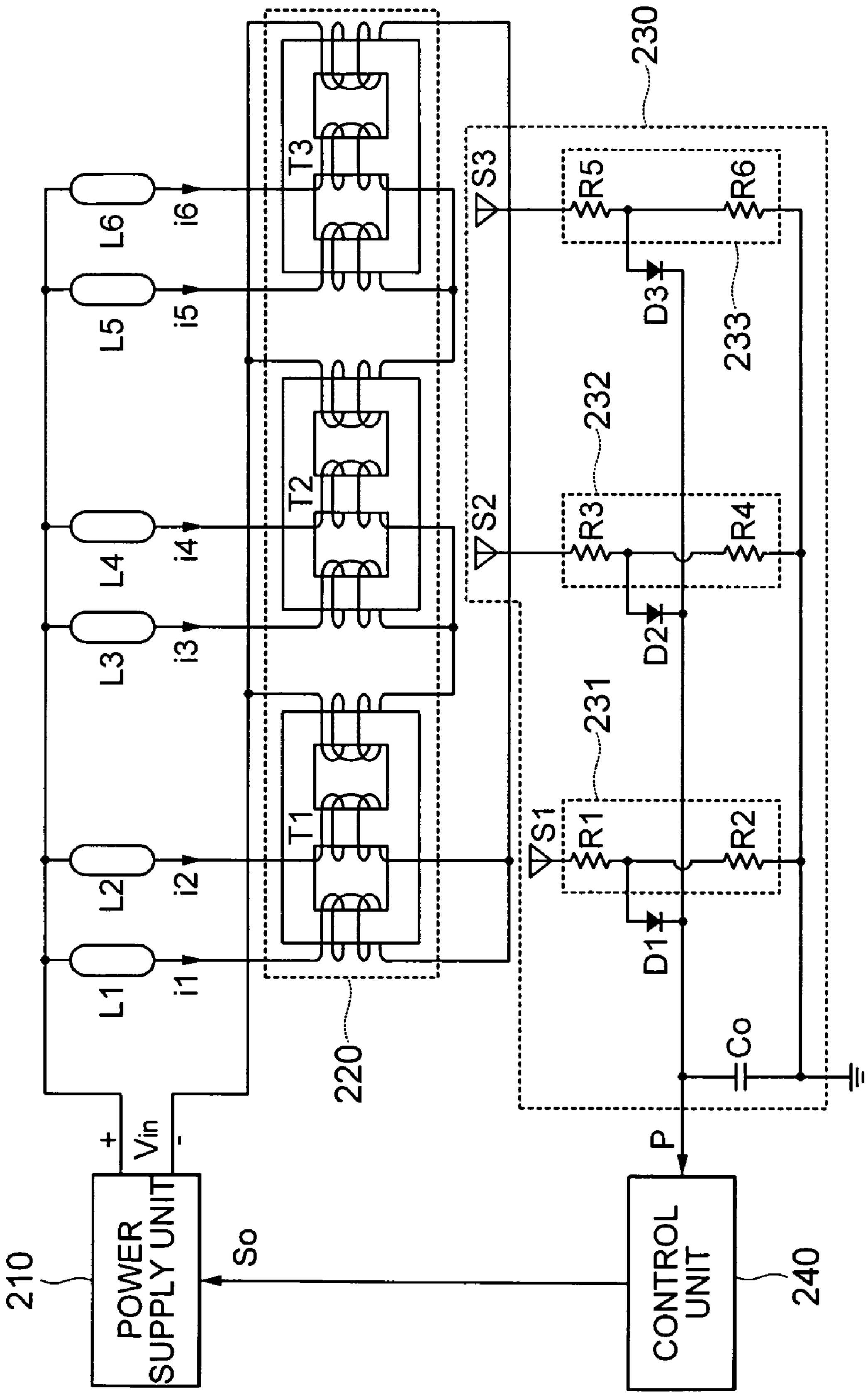

[FIG. 4]
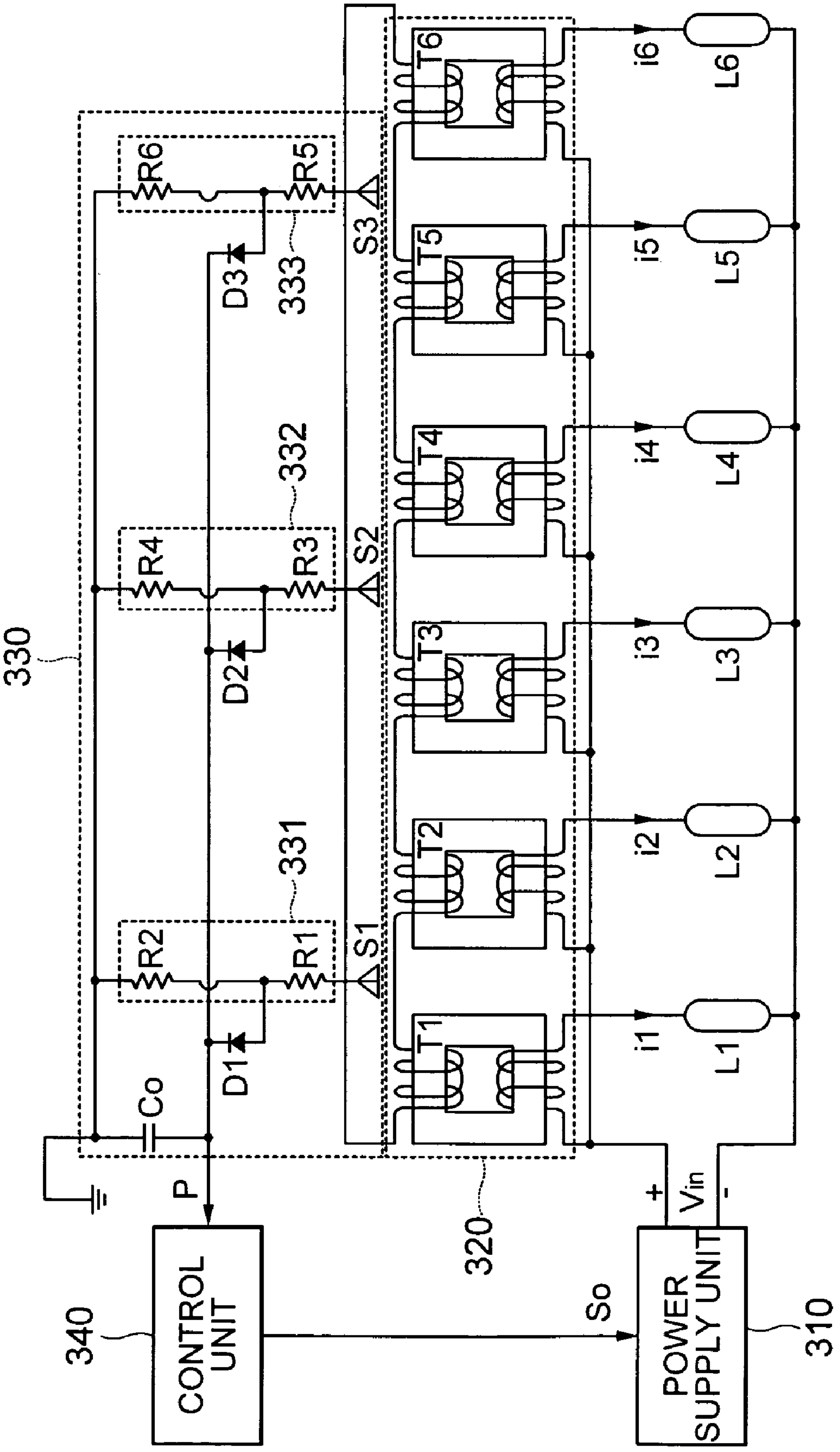

[FIG. 5]
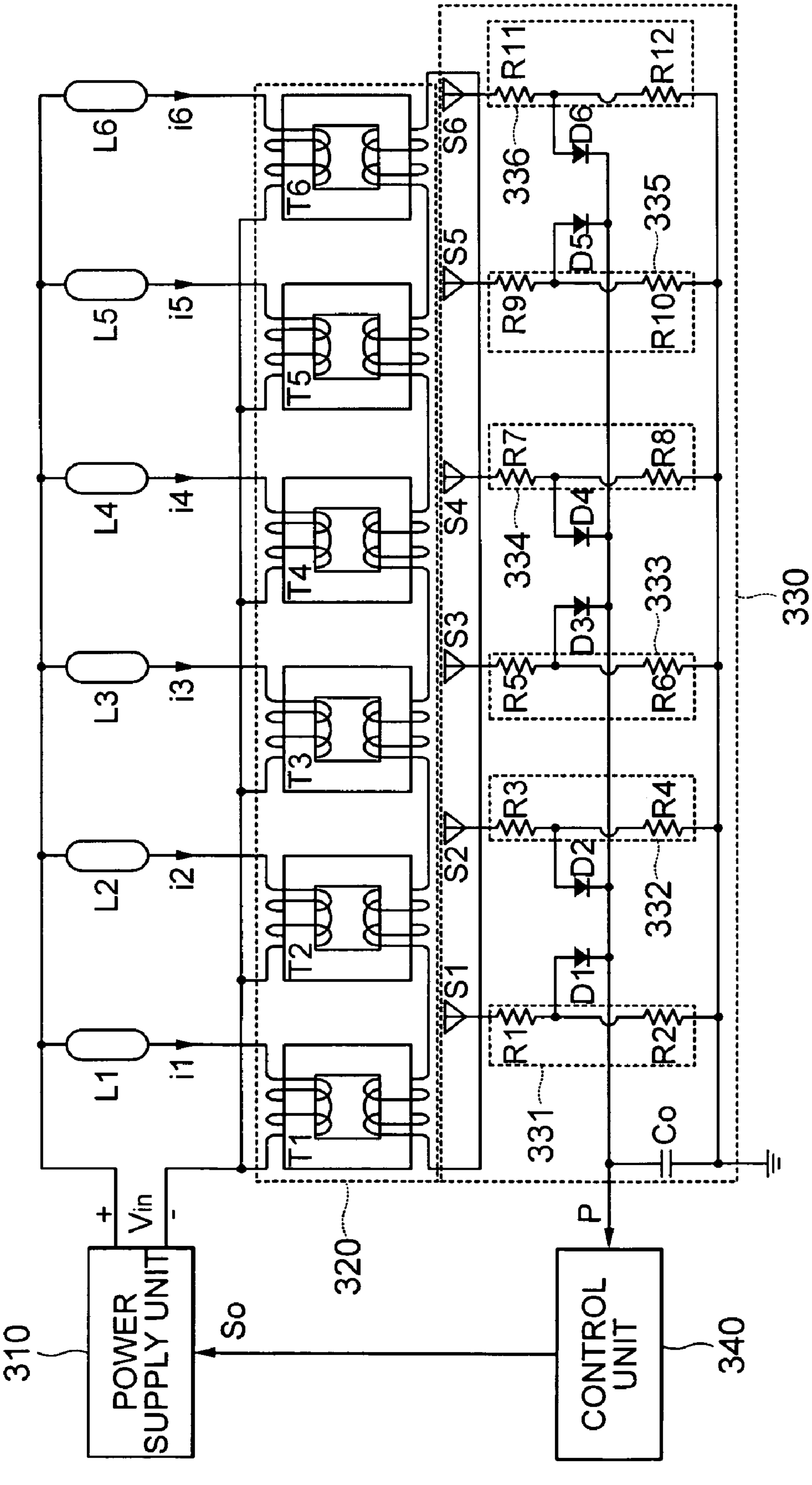

POWER SUPPLY DEVICE

CROSS-REFERENCE TO RELATED APPLICATIONS

This application claims the benefit of Korean Patent Application No. 10-2007-0133404 filed with the Korea Intellectual Property Office on Dec. 18, 2007, the disclosure of which is incorporated herein by reference.

BACKGROUND OF THE INVENTION

1. Field of the Invention

The present invention relates to a power supply device which can detect an open load through electromagnetic induction.

2. Description of the Related Art

In general, since LCD products such as LCD TVs or LCD monitors cannot emit light by themselves, a backlight device for providing light to an LCD panel is used therein. Such a backlight device provides light by using a plurality of discharge lamps. The resistance value of the respective lamps when the backlight device is initially driven is different from that of the lamps when the backlight device is normally driven. Therefore, when the lamps are driven in parallel, a current balance should be maintained using a current balancing transformer.

Further, when the lamps adopted in the backlight device are driven in parallel, the brightness of the lamps should be constantly maintained and adjusted. For this, a power supply unit of the backlight device is provided with a feedback circuit and a protection circuit. The feedback circuit receives the currents of the lamps to constantly maintain the lamp currents, and the protection circuit protects the lamps and the power supply unit when an excessive voltage is applied to the lamps.

Hereinafter, a conventional power supply device will be described with reference to FIG. 1.

FIG. 1 is a circuit diagram of a conventional power supply device.

As shown in FIG. 1, the conventional power supply device includes a power supply unit 110, a current balancing unit 120, a detection unit 130, and a control unit 140 and drives a plurality of loads L1 to L6 with constant brightness.

The power supply unit 110 is connected to the plurality of loads L1 to L6, the current balancing unit 120, and the control unit 140 and is controlled by the control unit 140 so as to output a driving voltage Vin for driving the plurality of loads L1 to L6.

The current balancing unit 120 is composed of a plurality of transformers T1 to T6 having primary and secondary sides. The current balancing unit 120 receives the driving voltage Vin output from the power supply unit 110 so as to balance currents of the driving voltage Vin. Then, the current balancing unit 120 supplies the driving voltage with a constant magnitude to the respective loads L1 to L6.

The number of the transformers T1 to T6 is equal to the number of the loads L1 to L6 such that the transformers T1 to T6 are connected to the respective loads L1 to L6 one by one. The primary sides of the transformers T1 to T6 receive the driving voltage Vin to supply to the respective loads L1 to L6. Further, the secondary sides thereof are connected in series to each other so as to maintain a current balance of the driving voltage Vin applied from the primary sides.

The detection unit 130 is connected to the current balancing unit 120 and the control unit 140 and includes a plurality of voltage dividing sections 131 to 136, first to sixth diodes D1 to D6, and a capacitor C0. The detection unit 130 detects a current flowing in the current balancing unit 120 so as to output a detection signal P corresponding to the detected current.

At this time, the plurality of voltage dividing sections 131 to 136 are connected to the secondary sides of the respective transformers T1 to T6 and respectively have two resistors. The voltage dividing sections 131 to 136 receive and divide a voltage corresponding to the current flowing in the connected transformers.

The first to sixth diodes D1 to D6 receive and output the voltages divided by the plurality of voltage dividing sections 131 and 136, and the capacitor C0 smoothes the divided voltages applied through the first to sixth diodes D1 to D6 to output as a detection signal P.

The control unit 140 is connected to the detection unit 130 and the power supply unit 110. When the detection signal P delivered through the detection unit 130 is larger or smaller than a preset reference voltage, the control unit 140 judges that one or more of the loads L1 to L6 are opened or short-circuited. Then, the control unit 140 outputs a control signal S for controlling the power supply unit 110.

Accordingly, when the loads are opened or short-circuited, the control unit 140 controls the power supply unit 110 so as to control the output of the driving voltages Vin is controlled. Then, it is possible to protect the plurality of loads L1 to L6 and the power supply device.

However, the conventional power supply device has the following problems.

In the conventional power supply device, one transformer should be provided to drive one load. In FIG. 1, six of the transformers T1 to T6 should be provided in the current balancing unit 120 to drive six of the loads L1 to L6. Therefore, as the number of loads increases, the volume of the power supply device increases, and the circuit becomes complex.

Further, the detection unit 130 of the conventional power supply device is directly connected to the plurality of transformers T1 to T6 required for insulation design. Therefore, there are difficulties in applying the detection unit 130 to a load requiring a high voltage.

SUMMARY OF THE INVENTION

An advantage of the present invention is that it provides a power supply device in which a current balancing unit is composed of a plurality of transformers having primary, secondary, tertiary sides such that the volume thereof can be reduced, and a detection unit detects currents flowing the current balancing unit through electromagnetic induction. Therefore, it is easily to achieve insulation design.

Additional aspects and advantages of the present general inventive concept will be set forth in part in the description which follows and, in part, will be obvious from the description, or may be learned by practice of the general inventive concept.

According to an aspect of the invention, a power supply device comprises a power supply unit that supplies a driving voltage for driving at least one or more loads; a current balancing unit that maintains a current balance of the driving voltage supplied to the respective loads; a detection unit that detects currents flowing in the current balancing unit through electromagnetic induction so as to output a detection signal; and a control unit that receives the detection signal to judge whether the loads are opened or not and outputs a control signal for controlling the magnitude of the driving voltage.

Preferably, the current balancing unit is composed of a plurality of transformers which respectively have primary, secondary, and tertiary sides and are respectively connected to two loads so as to supply the driving voltage to the loads. In each of the transformers, the primary and secondary sides thereof are connected to different loads from each other, and the tertiary side thereof is connected to the primary and secondary sides of a neighboring transformer.

Preferably, the detection unit includes a plurality of antenna sections that detect the currents flowing in the current balancing unit through electromagnetic induction; a plurality of voltage dividing sections that receive and divide a voltage corresponding to the currents detected by the respective antenna sections; a plurality of diodes of which the anodes are connected to the respective voltage dividing sections and the cathodes are connected to each other so as to output the divided voltages; and a capacitor that smoothes the voltages output through the plurality of diodes to output as a detection signal.

Preferably, the plurality of antenna sections detect the driving voltage output from the power supply unit or the currents flowing in the current balancing unit through electromagnetic induction, and the plurality of voltage dividing sections respectively have two division resistors connected in series to each other.

Preferably, the current balancing unit is composed of a plurality of transformers which respectively have primary and secondary sides and are respectively connected to one load so as to supply the driving voltage to the load. In each of the transformers, the primary side thereof is connected to the load, and the secondary side thereof is connected to the secondary side of a neighboring transformer.

According to another aspect of the invention, a power supply device comprises a power supply unit that supplies a driving voltage for driving at least one or more loads; a current balancing unit that maintains a balance of currents flowing in the respective loads; a detection unit that detects the currents flowing in the current balancing unit through electromagnetic induction so as to output a detection signal; and a control unit that receives the detection signal to judge whether the loads are opened or not, and outputs a control signal for controlling the magnitude of the driving voltages.

Preferably, the current balancing unit is composed of a plurality of transformers which respectively have primary, secondary, and tertiary sides and are respectively connected to two loads so as to balance the currents flowing in the respective loads. In each of transformers, the primary and secondary sides thereof are connected to different loads from each other, and the tertiary side thereof is connected to the primary and secondary sides of a neighboring transformer.

Preferably, the detection unit includes a plurality of antenna sections that detect the currents flowing in the current balancing unit through electromagnetic induction; a plurality of voltage dividing sections that receive and divide a voltage corresponding to the currents detected by the respective antenna sections; a plurality of diodes of which the anodes are connected to the respective voltage dividing sections and the cathodes are connected to each other so as to output the divided voltages; and a capacitor that smoothes the voltages output through the plurality of diodes to output as a detection signal.

Preferably, the plurality of antenna sections detect the driving voltage output from the power supply unit or the currents flowing in the current balancing unit through electromagnetic induction, and the plurality of voltage dividing sections respectively have two division resistors connected in series to each other.

Preferably, the current balancing unit is composed of a plurality of transformers which respectively have primary and secondary sides and are respectively connected to one load so as to balance the current flowing through the load. In each of the transformers, the primary side thereof is connected to the load, and the secondary side thereof is connected to the secondary side of a neighboring transformer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram of a conventional power supply device;

FIG. 2 is a circuit diagram of a power supply device according to a first embodiment of the invention;

FIG. 3 is a circuit diagram of a power supply device according to a modification of the first embodiment of the invention;

FIG. 4 is a circuit diagram of a power supply device according to the second embodiment of the invention; and FIG. 5 is a circuit diagram of a power supply device according to a modification of the second embodiment of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a power supply device for detecting an open load using electromagnetic induction according to the present invention will be described in detail with reference to the accompanying drawings.

First Embodiment

FIG. 2 is a circuit diagram of a power supply device according to a first embodiment of the invention.

As shown in FIG. 2, the power supply device according to the first embodiment of the invention includes a power supply unit 210 which outputs a driving voltage Vin for driving a plurality of loads L1 to L6, a current balancing unit 220 for balancing currents of the driving voltage Vin, a detection unit 230 for detecting currents flowing in the current balancing unit 220, and a control unit 240 for controlling the power supply unit 210.

The power supply unit 210 is connected to the plurality of loads L1 to L6, the current balancing unit 220, and the control unit 240 and is controlled by the control unit 240 so as to output a driving voltage Vin for driving the plurality of loads L1 to L6.

The current balancing unit 220, which is composed of first to third transformers T1 to T3, is connected to the power supply unit 210, the plurality of loads L1 to L6, and the detection unit 230 and serves to balance currents of the driving voltage Vin output from the power supply unit 210 so as to supply first to sixth currents i1 to i6 to the respective loads L1 to L6, the first to sixth currents i1 to i6 having the same magnitude.

Each of the first to third transformers T1 to T3 has an El-core structure that has primary, secondary, and tertiary sides. The primary and secondary sides are commonly connected to each other so as to be connected to the tertiary side of a neighboring transformer. In particular, the respective tertiary sides of the first to third transformers T1 to T3, which are connected to the power supply unit 210, receive the driving voltage Vin supplied from the power supply unit 210 and then induce the driving voltage Vin to the primary and secondary sides.

Accordingly, the current balancing unit 220 can balance currents i1 to i6 flowing in the first to third transformers T1 to T3, and then supplies the balanced currents i1 to i6 to the plurality of loads L1 to L6, thereby uniformly maintaining the brightness of the loads L1 to L6.

The current balancing unit 220 configured in such a manner requires only three of the first to third transformers T1 to T3 to drive six of the loads L1 to L6, while the conventional power supply device requires six transformers to drive six loads. Therefore, it is possible to reduce the size of the current balancing unit 220, which makes it possible to reduce the entire size of the power supply device.

As the number of transformers provided in the current balancing unit 220 decreases from six to three, the complexness of the circuit becomes so low that the circuit can be simplified.

In the invention, the power supply device for driving six loads L1 to L6 has been described. Therefore, in a power supply device for driving 12 loads, the number of transformers decreases from 12 to 6. Accordingly, as the number of loads increase, a circuit can be further simplified, and the volume of the circuit can be reduced.

The detection unit 230 includes first to third antenna sections S1 to S3, first to third voltage dividing sections 231 to 233, first to third diodes D1 to D3, and a capacitor C0. The detection unit 230, which is connected to the current balancing unit 220 and the control unit 240, detects a current flowing the current balancing unit 220 and then outputs a voltage-type detection signal P corresponding to the detected current.

The first to third antenna sections S1 to S3 of the detection unit 230 are connected to the first to third voltage dividing sections 231 to 233, respectively, and are positioned adjacent to the respective contacts between the primary and secondary sides of the first to third transformers T1 to T3 so as to detect currents flowing in the first to third transformers T1 to T3 through electromagnetic induction.

In this case, since the first to third antenna sections S1 to S3 detect currents flowing in the first to third transformers T1 to T3 through electromagnetic induction, the antenna sections can detect the currents in the form of voltage.

In particular, the first to third antenna sections S1 to S3 are not directly connected to the first to third transformers T1 to T3, but are spaced at a predetermined distance from the first to third transformers T1 to T3, respectively. Therefore, the insulation design is easily made. Further, the first to third antenna sections S1 to S3 can be formed in the lower side of positions where the first to third transformers T1 to T3 are mounted on a printed circuit board (not shown). Therefore, it is possible to reduce the volume of the power supply device.

The first to third antenna sections S1 to S3 may be positioned at positions adjacent to the connection line between the power supply unit 210 and the current balancing unit 220 so as to detect the driving voltages Vin output from the power supply unit 210.

The first to third voltage dividing units 231 to 233 respectively have two resistors connected in series to each other. Further, the first to third voltage dividing units 231 to 233 are connected to the first to third antenna sections S1 to S3, respectively, so as to divide the voltage detected by the first to third antenna sections S1 to S3.

The first to third diodes D1 to D3 have anodes connected to the first to third voltage dividing units 231 to 233, respectively, and cathodes connected to one end of the capacitor C0, and supply the voltages divided by the first to third voltage dividing units 231 to 233 to the capacitor C0.

The capacitor C0 has one end connected to contacts between the cathodes of the first to third diodes D1 to D3 and the control unit 240 and the other end grounded so as to set the voltage applied through the first to third diodes D1 to D3 to a detection signal P to deliver to the control unit 240.

When any one of the plurality of loads L1 to L6 is opened, a high current is momentarily applied to a transformer connected to the opened load, among the first to third transformers T1 to T3. The detection unit 230 detects the current to output a high-voltage detection signal P.

The control unit 240, which is connected to the detection unit 230 and the power supply unit 210, receives the detection signal P from the detection unit 230 and then compares the detection signal P with a preset reference voltage. When the magnitude of the detection signal P is equal to that of the reference voltage, the control unit 240 judges that an overcurrent or overvoltage did not occur in the driving voltage Vin supplied to the plurality of loads L1 to L6 and the loads L1 to L6 were not short-circuited or opened (normal state). Then, the control unit 240 outputs a control signal S0 for driving the power supply unit 210 in a current state, thereby controlling the power supply unit 210.

When the magnitude of the detection signal P is not equal to that of the reference voltage, that is, when the magnitude of the detection signal P is larger or smaller than that of the reference voltage, the control unit 240 judges that an overcurrent or overvoltage occurred in the driving voltages Vin or the plurality of loads L1 to L6 were short-circuited or opened. Then, the control unit 240 outputs a control signal S0 for stopping the power supply unit 210. Therefore, it is possible to prevent the damage of the power supply device caused by the overcurrent or overvoltage and the short-circuit or open state.

FIG. 3 is a circuit diagram of a power supply device according to a modification of the first embodiment of the invention. As shown in FIG. 3, the power supply device according to the modification of the first embodiment of the invention includes a power supply unit 210, a current balancing unit 220, a detection unit 230, and a control unit 240 and drives a plurality of loads L1 to L6.

The current balancing unit 220 is not connected to the high-voltage side of the power supply unit 210, but is connected to the low-voltage side of the plurality of loads L1 to L6 so as to balance currents flowing in the loads L1 to L6.

In the power supply device according to the modification of the first embodiment of the invention, the current balancing unit 220 is composed of first to third transformers T1 to T3 having primary, secondary, and tertiary sides, similar to the first embodiment. Therefore, the number of transformers can be reduced, which makes it possible to reduce the size of the power supply device.

Further, since the detection unit 230 detects the currents flowing through the plurality of loads L1 to L6 through electromagnetic induction, the insulation design is easily achieved. Further, as antenna sections S1 to S3 are mounted within a printed circuit board, the size of the power supply device can be reduced.

Second Embodiment

Hereinafter, a power supply device according to a second embodiment of the invention will be described with reference to FIGS. 4 and 5. The descriptions of the same components of the second embodiment as those of the first embodiment will be omitted.

FIG. 4 is a circuit diagram of a power supply device according to the second embodiment of the invention.

As shown in FIG. 4, the power supply device according to the second embodiment of the invention includes a power supply unit 310, a current balancing unit 320, a detection unit 330, and a control unit 340 and drives a plurality of loads L1 to L6 with constant brightness.

The current balancing unit 320 is composed of transformers T1 to T6 of which the number is equal to the number of the loads L1 to L6. Each of the transformers T1 to T6 has a primary side and a secondary side.

The primary sides of the transformers T1 to T6 are connected to the power supply unit 310. The primary sides of the transformers T1 to T6 receive a driving voltage Vin supplied from the power supply unit 310 and then supply the driving voltage Vin to the loads L1 to L6, respectively, so as to induce the driving voltage Vin to the secondary sides.

The secondary sides of the transformers T1 to T6 are connected in series to each other so as to balance currents corresponding to the driving voltages Vin induced from the primary sides, respectively. Accordingly, the plurality of transformers T1 to T6 of the current balancing unit 320 can balance the currents i1 to i6 corresponding to the driving voltages Vin supplied to the plurality of loads L1 to L6.

The detection unit 330 includes a plurality of antenna sections S1 to S3 spaced at a predetermined distance from the transformers T1 to T6, a plurality of voltage dividing sections 331 to 333, first to third diodes D1 to D3, and a capacitor C0.

The detection unit 330 configured in such a manner detects a current flowing in the secondary sides of the transformers T1 to T6 through the first to third antenna sections S1 to S3 by using electromagnetic induction and then outputs a detection signal P corresponding to the current.

Then, as the control unit 340 receives the detection signal P to judge whether the plurality of loads L1 to L6 are opened or short-circuited or not, the control unit 340 can control the power supply unit 310. Therefore, it is possible to prevent the damage of the power supply device.

In the power supply device according to the second embodiment of the invention, the first to third antenna sections S1 to S3 of the detection unit 330 are not directly connected to the secondary sides of the transformers T1 to T6, but detect the currents flowing in the transformers T1 to T6 through the electromagnetic induction. Therefore, the insulation design for the transformers T1 to T6 is easily achieved. Accordingly, it is easily to configure a power supply device for driving loads which require a high voltage.

FIG. 5 is a circuit diagram of a power supply device according to a modification of the second embodiment of the invention. As shown in FIG. 5, the power supply device according to the modification of the second embodiment of the invention has a configuration that the current balancing unit 320 and the detection unit 330 are connected to a low voltage side of the loads without receiving the driving voltage Vin of the power supply unit 310.

Accordingly, the current balancing unit 330 receives currents flowing through the plurality of loads L1 to L6 and then balances the currents i1 to i6. Further, the detection unit 330 detects the current balanced by the current balancing unit 320 through electromagnetic induction. Therefore, the detection unit 330 can judge the abnormalities of the loads L1 to L6, that is, whether the loads L1 to L6 are opened or short-circuited or not.

Further, one antenna section may be provided to each of the transformers T1 to T6 so as to detect a current flowing in the current balancing unit 330.

Meanwhile, in the power supply device according to the first and second embodiments of the invention, the configuration for driving six loads L1 to L6 has been described, but is only an example for the detailed descriptions. The number of loads is not limited thereto.

According to the present invention, the current balancing unit is composed of the transformers having the primary, secondary, and tertiary sides. Therefore, it is possible to reduce the volume of the power supply device.

Further, the detection unit is not directly connected to the transformers, but detects currents flowing in the current balancing unit through the electromagnetic induction. Therefore, the insulation design of the transformer can be easily achieved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply devices, comprising:

a power supply unit that supplies a driving voltage for driving at least one or more loads;

a current balancing unit that maintains a current balance of the driving voltage supplied to the respective loads;

a detection unit that detects currents flowing in the current balancing unit through electromagnetic induction so as to output a detection signal; and a control unit that receives the detection signal to judge whether the loads are opened or not and outputs a control signal for controlling the magnitude of the driving voltage;

wherein the current balancing unit is composed of a plurality of transformers which respectively have primary, secondary, and tertiary sides and are respectively connected to two loads so as to supply the driving voltage to the loads; and wherein in each of the transformers, the primary and secondary sides are connected to different loads, and the tertiary side is connected to the primary and secondary sides of a neighboring transformer.

2. A power supply device, comprising:

a power supply unit that supplies a driving voltage for driving at least one or more loads;

a current balancing unit that maintains a current balance of the driving voltage supplied to the respective loads;

a detection unit that detects currents flowing in the current balancing unit through electromagnetic induction so as to output a detection signal; and a control unit that receives the detection signal to judge whether the loads are opened or not and outputs a control signal for controlling the magnitude of the driving voltage;

wherein the detection unit includes:

a plurality of antenna sections that detect the currents flowing in the current balancing unit through electromagnetic induction;

a plurality of voltage dividing sections that receive and divide a voltage corresponding to the currents detected by the respective antenna sections;

a plurality of diodes which have anodes connected to the respective voltage dividing sections and cathodes connected to each other so as to output the divided voltages; and a capacitor that smoothes the voltages output through the plurality of diodes to output as the detection signal.

3. The power supply device according to claim 2, wherein the plurality of antenna sections detect the driving voltage output from the power supply unit or the currents flowing in the current balancing unit through electromagnetic induction.

4. The power supply device according to claim 2, wherein the plurality of voltage dividing sections respectively have two division resistors connected in series to each other.

5. The power supply device according to claim 2, wherein the current balancing unit is composed of a plurality of transformers which respectively have primary and secondary sides and are respectively connected to one load so as to supply the driving voltage to the load.

6. The power supply device according to claim 5, wherein in each of the transformers, the primary side is connected to the load, and the secondary side is connected to the secondary side of a neighboring transformer.

7. A power supply devices, comprising:

a power supply unit that supplies a driving voltage for driving at least one or more loads;

a current balancing unit that maintains a balance of currents flowing in the respective loads;

a detection unit that detects the currents flowing in the current balancing unit through electromagnetic induction so as to output a detection signal; and a control unit that receives the detection signal to judge whether the loads are opened or not, and outputs a control signal for controlling the magnitude of the driving voltages;

wherein the current balancing unit is composed of a plurality of transformers which respectively have primary, secondary, and tertiary sides and are respectively connected to two loads so as to balance the currents flowing in the respective loads; and wherein in each of transformers, the primary and secondary sides are connected to different loads, and the tertiary side is connected to the primary and secondary sides of a neighboring transformer.

8. A power supply device, comprising:

a power supply unit that supplies a driving voltage for driving at least one or more loads;

a current balancing unit that maintains a balance of currents flowing in the respective loads;

a detection unit that detects the currents flowing in the current balancing unit through electromagnetic induction so as to output a detection signal; and a control unit that receives the detection signal to judge whether the loads are opened or not, and outputs a control signal for controlling the magnitude of the driving voltages;

wherein the detection unit includes:

a plurality of antenna sections that detect the currents flowing in the current balancing unit through electromagnetic induction;

a plurality of voltage dividing sections that receive and divide a voltage corresponding to the currents detected by the respective antenna sections;

a plurality of diodes which have anodes connected to the respective voltage dividing sections and cathodes connected to each other so as to output the divided voltages; and a capacitor that smoothes the voltages output through the plurality of diodes to output as the detection signal.

9. The power supply device according to claim 8, wherein the plurality of antenna sections detect the driving voltage output from the power supply unit or the currents flowing in the current balancing unit through electromagnetic induction.

10. The power supply device according to claim 8, wherein the plurality of voltage dividing sections respectively have two division resistors connected in series to each other.

11. The power supply device according to claim 8, wherein the current balancing unit is composed of a plurality of transformers which respectively have primary and secondary sides and are respectively connected to one load so as to balance the current flowing through the load.

12. The power supply device according to claim 11, wherein in each of the transformers, the primary side is connected to the load, and the secondary side is connected to the secondary side of a neighboring transformer.

* * * * *